United States Patent [19]
Sperduti et al.

[11] Patent Number: 4,798,282
[45] Date of Patent: Jan. 17, 1989

[54] ZONING CONVEYOR

[75] Inventors: Bernard D. Sperduti, Amherst; James A. Cerankowski, West Seneca, both of N.Y.

[73] Assignee: HiTech Robotics Ltd., Buffalo, N.Y.

[21] Appl. No.: 121,650

[22] Filed: Nov. 17, 1987

[51] Int. Cl.[4] .............................................. B65G 13/06
[52] U.S. Cl. .................................. 198/781; 193/35 A
[58] Field of Search ....................... 198/781; 193/35 A

[56] References Cited

U.S. PATENT DOCUMENTS

| | | | |
|---|---|---|---|
| 886,998 | 5/1908 | Love. | |
| 1,831,015 | 11/1931 | Le Mare. | |
| 2,602,536 | 7/1952 | Eggleston | 198/781 |
| 3,327,837 | 6/1967 | Covell. | |
| 3,513,960 | 5/1970 | Adams | 198/781 |
| 3,527,087 | 9/1970 | Converse et al. | |
| 3,563,721 | 2/1971 | Ritter. | |
| 3,610,406 | 10/1971 | Fleischauer et al. | 198/781 |
| 3,612,247 | 10/1971 | Pipp. | |
| 3,951,255 | 4/1976 | Shuttleworth et al. | |
| 4,006,815 | 2/1977 | Werntz | 198/781 |
| 4,013,161 | 3/1977 | Nelson | 198/781 |
| 4,109,783 | 8/1978 | Vogt. | |
| 4,193,493 | 3/1980 | Ekstrand. | |
| 4,266,660 | 5/1981 | Herman. | |
| 4,331,228 | 5/1982 | Galarowic. | |
| 4,372,441 | 2/1983 | Krammer | 198/781 |
| 4,406,360 | 9/1983 | Smith et al. | 198/781 |
| 4,421,224 | 12/1983 | Dingman | 198/781 |
| 4,453,627 | 6/1984 | Wilkins. | |
| 4,469,220 | 9/1984 | Becker. | |
| 4,562,920 | 1/1986 | Jaffre | 198/781 |

FOREIGN PATENT DOCUMENTS 2416703 5/1974 Fed. Rep. of Germany.

OTHER PUBLICATIONS

Webb-Norfolk UNITROQUE, Unit Load Accumulation on Chain Driven Live Rollers.

Primary Examiner—Joseph E. Valenza
Attorney, Agent, or Firm—Christel, Bean & Linihan

[57] ABSTRACT

A zoning conveyor (10) formed of a plurality of drive rollers (14) upon which are mounted sleeves (40) normally capable of rotating with the drive rollers by frictional contact therewith, but capable of being stopped while the drive rollers continue to rotate. Connecting structures (44, 46 or 78, 80) are provided for interconnecting selected sleeves (40) within a selected zone in such a manner that the selected sleeves within the zone all have the same rotational speed. Stop structures are provided which are capable of stopping at least one of the selected sleeves within a zone from rotating whereby all selected sleeves within the zone are caused to be stopped from rotation by the connecting structures. The stop structure may be a gate (48), a brake in the form of a disk (60) and a shiftable element (64) capable of engaging the disk to prevent its rotation. Alternatively, the brake may be a belt (82) loosely disposed over two adjacent sleeves and which is anchored to the conveyor frame, which belt may be tightened to prevent rotation of the adjacent sleeves. Article position sensors are also disclosed, these including a microswitch (74, 76) or an electric eye and reflector (96, 98).

12 Claims, 2 Drawing Sheets

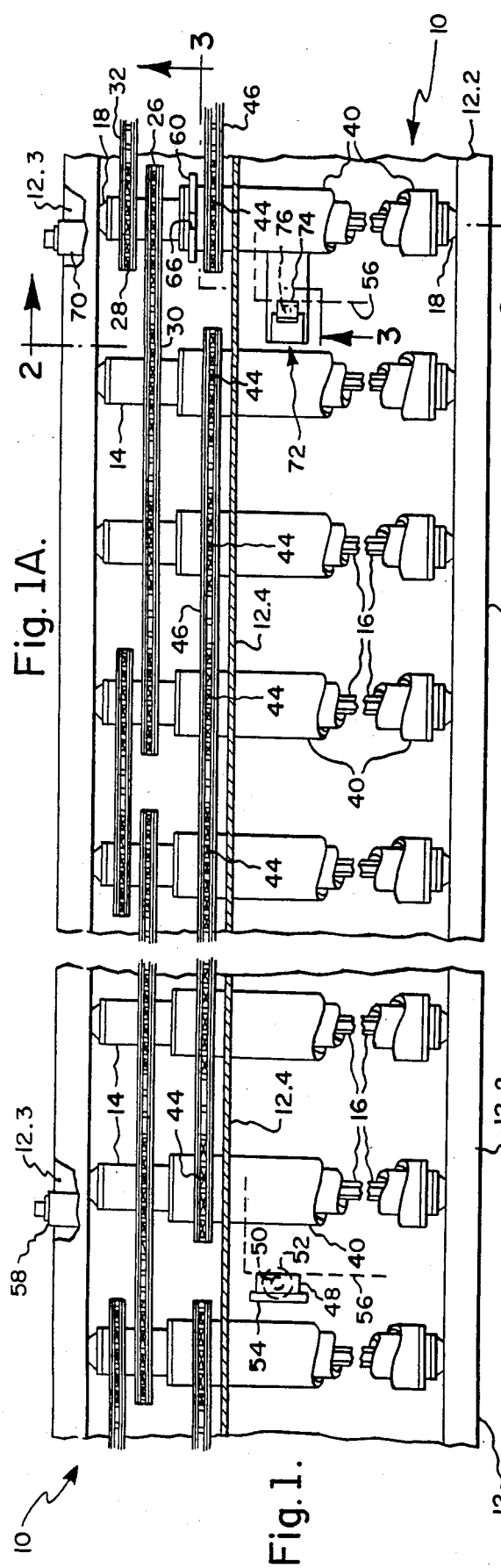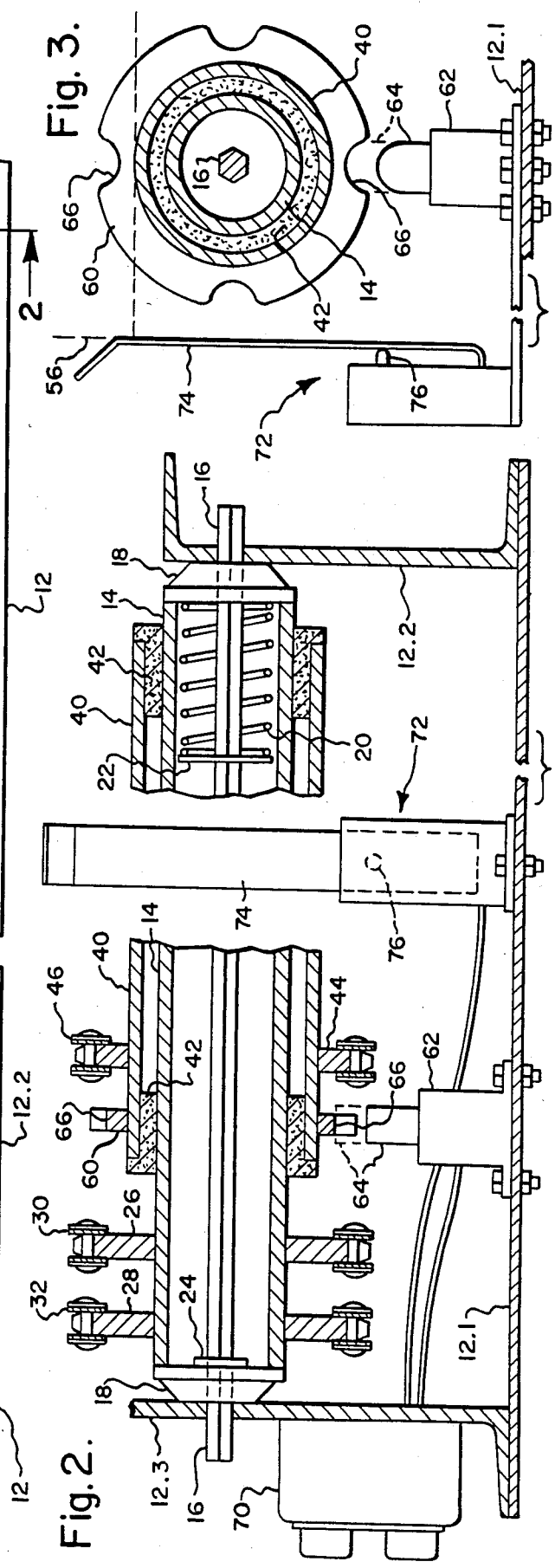

ZONING CONVEYOR

TECHNICAL FIELD

The present invention relates generally to conveyors and more particularly to driven roller conveyors of the type provided with means for stopping articles conveyed upon the rollers within one or more selected zones.

BACKGROUND

Driven roller type conveyors are well known in the art and one such example is shown in U.S. Pat. No. 4,266,660 issued May 12, 1981. This form of conveyor includes a plurality of driven rollers, each roller being provided with a sleeve which is journalled about the roller for rotation therewith. This general type of conveyor is well accepted in the industry. Articles, such as boxes or pallets, conveyed by this form of conveyor can be stopped by stopping the entire conveyor line. Alternatively a single article can be stopped by positioning a gate across its path, which will then cause the sleeves upon which the article rests, to stop from rotation about the drive rollers. While this design is satisfactory when accumulating articles at any particular work station, it has the disadvantage in that additional articles on the conveyor which have not been stopped by other gates will continue to advance to the particular work station where the article has been stopped. In some situations it is desirable that a zone be provided in which no articles are being conveyed to prevent one article from contacting the stopped article, this being referred to in the art as a zoning type conveyor.

OBJECTS AND SUMMARY OF THE INVENTION

It is an object of the present invention to provide a driven roller conveyor provided with zoning features. More particularly, it is an object of the present invention to provide a zoning conveyor including a plurality of driven rollers about which sleeves are frictionally journalled, connecting means which interconnect selected sleeves within a zone, and stopping means for stopping the selected sleeves within the zone when zoning is required.

The above is achieved by providing selected sleeves within a zone with sprockets or sheaves, and interconnecting the sprockets or sheaves by chains or belts, respectively. By employing this design when one of the selected sleeves is stopped, all selected sleeves within the zone will be stopped.

The foregoing will be more fully understood after a consideration of the following detailed description taken in conjunction with the accompanying drawings in which preferred forms of this invention are illustrated.

BRIEF DESCRIPTION OF THE DRAWINGS

FIG. 1 is a plan view of a portion of a conveyor in which the principles of this invention are illustrated, this view illustrating a first form of connecting means and a first form of stopping means.

FIG. 1A is an extension of FIG. 1 but illustrates a second form of stopping means and a first form of an article position sensor.

FIG. 2 is a section taken generally along the line 2—2 in FIG. 1A.

FIG. 3 is a section taken generally along the line 3—3 in FIG. 1A.

DETAILED DESCRIPTION

Figure 4:
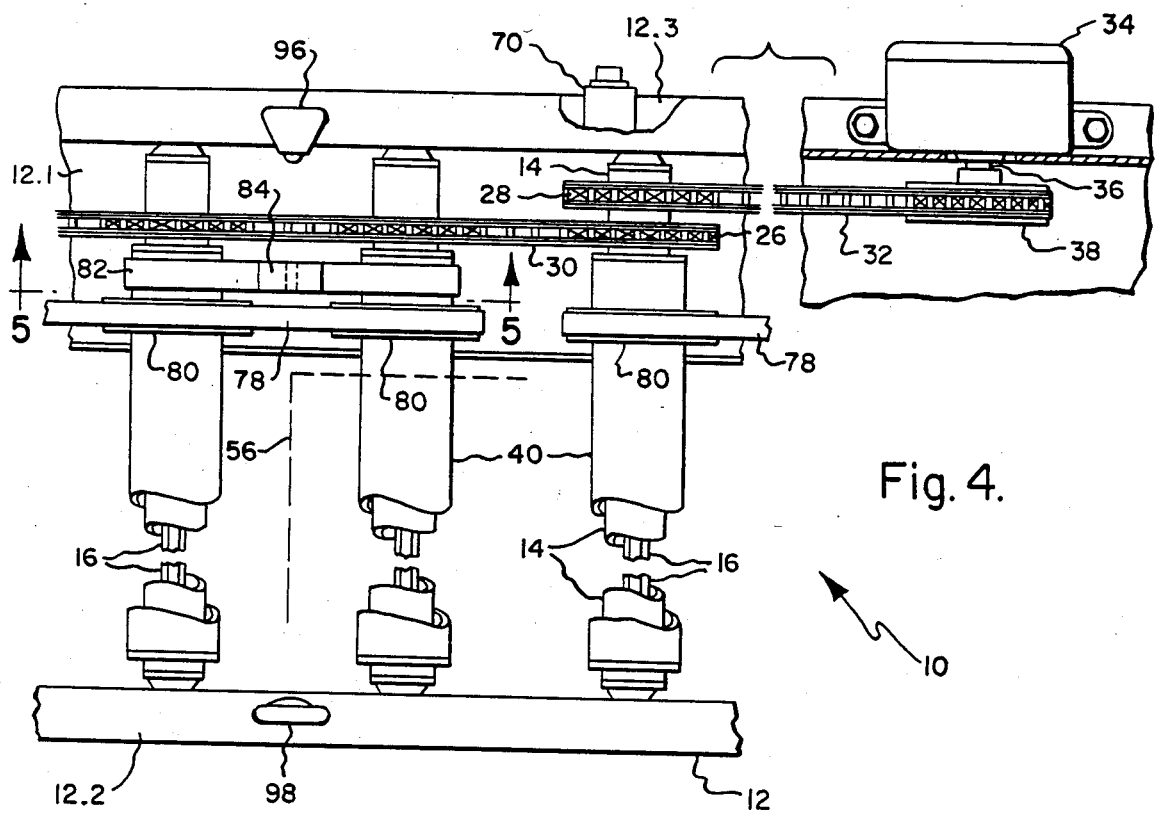
FIG. 4 is a view somewhat similar to FIGS. 1 and 1A but illustrating a second form of connecting means, a third form of stopping means, and a second form of an article position sensor.

Referring first to FIG. 1 the zoning conveyor of this invention, which is indicated generally at 10, includes a frame 12 upon which are mounted a plurality of drive rollers 14. The frame 12 includes a base plate 12.1 upon which are mounted front and rear vertical frame members 12.2 and 12.3 and an intermediate frame member 12.4. The front and rear members are provided with a plurality of aligned apertures which receive shafts 16. Mounted upon the shafts 16 are bearing assemblies 18 which are secured to the tubular drive rollers in such a manner that the rollers 14 can rotate about the shafts 16. As is common in the art, the shafts can be telescoped within the tubes 14 to permit assembly and disassembly to the vertical frame members 12.2 and 12.3. To this end, a spring 20 is mounted within each of the tubular drive rollers 14, the spring at one end bearing against a bearing assembly 18 and at the other end bearing against a washer or the like 22 fixed to the shaft 16. This will in turn cause the shaft to be biased to the left (as viewed in the FIG. 2) until a stop 24 abut against the opposite bearing assembly 18. To disassemble the roller from the frame 12 it is only necessary to shift the shaft 16 to the right to free the left hand end permitting disassembly of the drive rollers.

Drive means are provided for driving all drive rollers 14. The drive means includes sprockets and chains and a drive motor. Thus, secured to selected drive roller 14 adjacent the rear frame member 12.3 are pair of adjacent sprockets 26, 28 over which drive chains 30, 32 are disposed. Of course not every drive roller need be provided with two sprockets 26, 28 as can be seen from FIGS. 1 and 1A, but it should be appreciated that the interconnecting chains 30, 32 and sprockets 26, 28 permit all rollers to be driven by a single drive. The driver motor 34 is illustrated in FIG. 4 and it can be seen that the output shaft 36 of the motor is provided with a sprocket 38 over which one end of a chain 30 or 32 is passed to provide a drive to all of the drive rollers 14. The motor 34 is mounted on the frame 12.1 in any conventional manner.

Journalled about each of the drive rollers 14 is a sleeve 40, each sleeve 40 being provided with annular bearings 42 which are journalled about the rollers 14. The bearings may be made of wood, nylon, or the like. In normal operation when the rollers 14 are being rotated to convey articles in one direction (to the left in FIGS. 1 and 1A), the sleeves 40 will rotate therewith due to the frictional contact between the bearings 42 and rollers 14. However, it should be appreciated that a sleeve may be held from rotation even when the rollers 14 are rotating as the bearing 42 would then slide upon the driven roller 14.

In accordance with the principles of this invention connecting means are provided for interconnecting selected sleeves within a zone. In the embodiment shown in FIGS. 1 through 3 the connecting means includes sprockets 44 mounted on selected sleeves within the zone, the selected sleeves including at least the first and last sleeves within the zone and sufficient intermediate sleeves to prevent inadvertent conveying of an article within a zone if it is desired to keep the articles from being conveyed within the zone. Thus, in FIG. 1, a sprocket is disclosed as being mounted on every sleeve within a zone, these sprockets being interconnected with each other by a zoning chain 46. It should be appreciated that if one of the selected sleeves were stopped from rotation, all selective sleeves within the zone would also be stopped. To this end, stop means are provided, and various stop means are illustrated within the drawings. In FIG. 1 the stop means consists of a gate shiftable between operative and inoperative positions. The gate in the embodiment illustrated is a rectangular member 48 carried by the upper end of a piston rod 50 which extends out of a cylinder 52. The cylinder is mounted upon the frame 12.1. The rectangular member 48 is held from rotation by a back stop 54 secured to an upper portion of the cylinder 52. When the piston is retracted within the cylinder 52 articles which are being conveyed by the conveyor, which articles are shown by phantom lines 56, will be free to pass over the stop. However, when the piston rod is extended an article 56 will contact the stop 48. The operation of the gate may be controlled by an operator at the work station through a control box 58, or by article position sensors such as types disclosed in conjunction with FIGS. 1A and 4. After the article 56 comes to a stop, it will cause all selected sleeves within the zone to also come to a stop due to the frictional contact between the article and the sleeves upon which it is resting. If the article 56 is of relatively light weight it may be necessary to provide the exterior of the surface of the sleeves 40 with frictional material to insure that the friction between the sleeves 40 and the article 56 is greater than the coefficient of friction between the sleeves 40 and the drive rollers 14. In FIGS. 1A, 2 and 3 a second form of stopping means is illustrated, this being brake means which include a disk-like element 60 secured to an end portion of one selected sleeve and further includes shiftable means. The shiftable means includes a housing 62 mounted upon the frame 12.1. The shiftable means includes a portion 64 movable between operative and inoperative positions and capable when in the operative position of engaging the disk-like element 60 to prevent its rotation. While the disk-like element may be simply a disk, it may also be provided with notches 66 on its outer surface. When this is the case, the shiftable means consists essentially of a stop element which may be shifted by a solenoid or the like from either a lower inoperative position shown in full line in FIG. 3 to a raised operative position shown in broken lnes in FIG. 3 wherein the stop element will engage one of the notches 66 to prevent rotation of the selected sleeve. The solenoid or the like is mounted within the housing 62.

The operation of the brake means may be controlled in any manner. To this end a control box 70 is mounted to one side of the conveyor. The control box may be operated manually or it may be controlled by operation of an article position sensor. One form of article position sensor includes a microswitch assembly 72. The microswitch assembly will include a leaf spring element 74 which is adapted to be disposed in the path of the articles 56 being conveyed by the conveyor, which leaf spring 74 will be adapted cause operation of an electrical switch 76. The electrical switch may in turn be interconnected with the brake means in such a manner as to cause its immediate operation. However, it may be interconnected through the controller 70 in such a manner that articles being conveyed down the conveyor will be stopped at preselected time intervals after the switch 76 has been contacted. In addition, the controller may be controlled in such a manner that only selected articles will be stopped at the particular work station which is associated with the controller 70, such as every third article.

Figure 5:
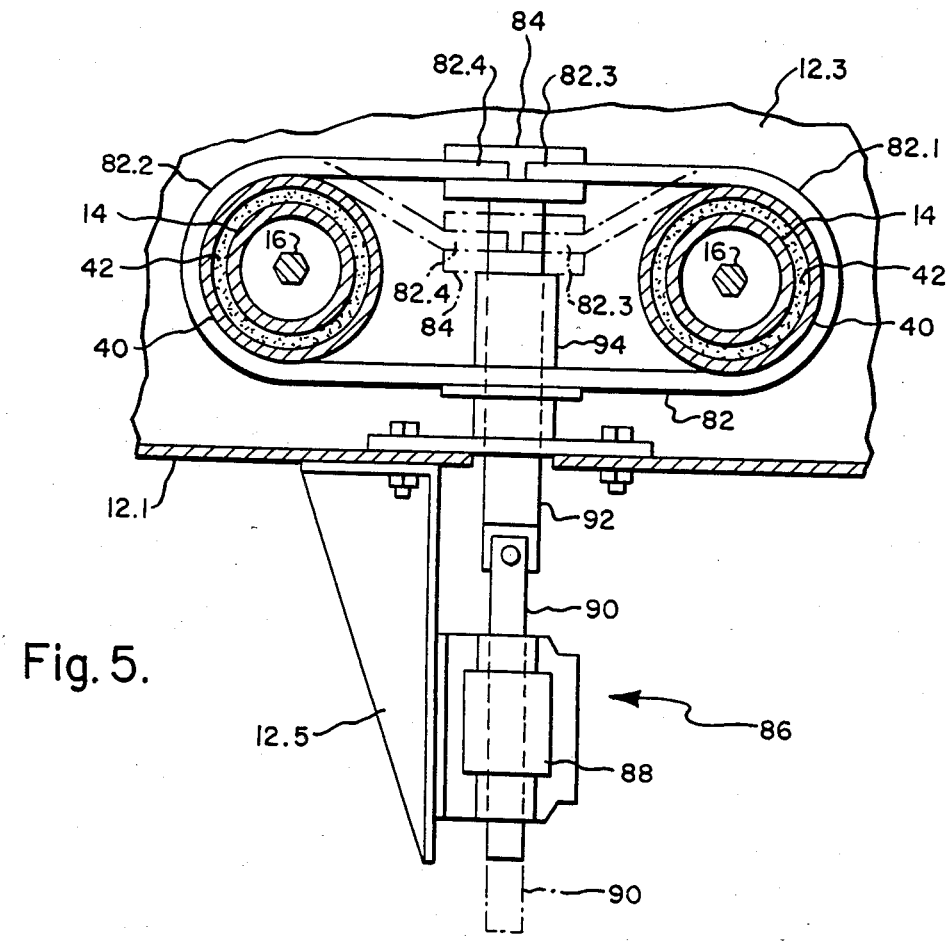
FIG. 5 is a section taken generally along the line 5—5 in FIG. 4.

Referring now to FIGS. 4 and 5, a second form of connecting means as illustrated as well as a third form of stop means and a second article position indicator. As shown in FIGS. 4 and 5 sleeves 40 are journalled about rollers 14 in the same manner as FIGS. 1 through 3. However, the selected sleeves within a zone are interconnected with each other by zoning belts 78 which engage sheaves 80 on selected sleeves 40 within a zone. The zoning belts 78 will cause all selected sleeves 40 to rotate at the same speed. The third form of stop means consists of a brake assembly including a belt 82 which has first and second intermediate portions 82.1 and 82.2 disposed about adjacent sleeves 40, the ends 82.3 and 82.4 of the belt being secured to a clasp 84. The clasp 84 is in turn interconnected with moving means indicated generally at 86, the moving means being mounted upon the frame by frame bracket 12.5. The moving means includes a solenoid 88 which is capable of shifting a rod 90 between a raised inoperative position shown in full lines in FIG. 5 to a lowered operative positions shown in broken lines in FIGS. 5. The rod 90 is in turn interconnected with an extension 92, the other end of the extension being secured to the clasp 84. In order to provide stability to the extension a tubular member 94 is secured to the frame 12.1, the extension 92 passing through the tubular portion. The article position indicator in the design illustrated in FIGS. 4 and 5 includes an electric eye 96 and reflector 98. When an article 56 which is being conveyed down the conveyor interrupts the beam of the electric eye 96 a signal can be transmitted to the moving means 86 via control 70 to cause the rod 90 to shift downwardly to its operative position which will then cause the intermediate portions 82.1 and 82.2 of the belt 82 to tightly engage the associated sleeves 40 to prevent the rotation of the sleeves. As selective sleeves within the zone are interconnected to each other by the belt and sheaves 78, 80, respectively, all selected sleeves within the zone will be caused to be stopped.

While various article position indicators have been illustrated as well as various forms of stop means and connecting means, it should be appreciated that other forms may be utilized in the practice of the broader aspects of this invention. In addition, the various article position indicators, stop means, and connecting means can be intermixed in any suitable manner. Thus, while preferred structures in which the principles of the present invention have been incorporated are shown and described above, it is to be understood that this invention is not to be limited to the particular details shown and described above, but that, in fact, widely differing means may be employed in the broader/aspects of this invention.

What is claimed is:

1. A zoning conveyor comprising
    frame;
    a plurality of drive rollers mounted on said frame;

drive means mounted on said frame and capable of driving said rollers in such a manner that all rollers are driven at the same rotational speed;

a sleeve journalled about each of said rollers, each sleeve normally rotating with the roller about which it is journalled by frictional contact therewith, but each sleeve being capable of being held from rotation during rotation of the roller about which it is journalled;

connecting means interconnecting selected sleeves within a selected zone in such a manner that the selected sleeves within the zone all have the same rotational speed; and stop means mounted on said frame and capable of stopping at least one of said selected sleeves within said zone from rotating whereby all selected sleeves within that said zone are caused to be stopped from rotation by said connecting means.

2. The zoning conveyor as set forth in claim 1 wherein the connecting means includes a sprocket mounted on each of the selected sleeves, and a chain interconnecting all sprockets within the zone.

3. The zoning conveyor as set forth in claim 1 wherein the connecting means includes a sheave mounted on each of the selected sleeves, and a belt interconnecting all sheaves within the zone.

4. The zoning conveyor as set forth in claim 1 wherein the stop means is a gate shiftable between operative and inoperative positions, said gate being capable of being engaged by an article being conveyed by the conveyor to stop movement of the article, said article in turn causing those selected sleeves upon which it is resting to stop rotation, through frictional contact whereby all sleeves within the zone are stopped from rotation.

5. The zoning conveyor as set forth in claim 1 wherein the stop means includes brake means capable of engaging a selected sleeve to stop rotation therewith.

6. The zoning conveyor as set forth in claim 5 wherein the brake means includes a disk-like element secured to a selected sleeve for rotation therewith, and shiftable means mounted on said frame and capable of engaging said disk-like element to prevent rotation of said element.

7. The zoning conveyor as set forth in claim 5 wherein the brake means includes a belt having intermediate portions disposed about a selected sleeve and an adjacent sleeve, clasp means disposed between said selected sleeve and said adjacent sleeve and engaging the ends of the belt and moving means mounted on said frame and engaging said clamp means and capable of moving the clasp means from a first position wherein the intermediate portions of the belt are loosely disposed about said selected sleeve and said adjacent sleeve to a second position wherein the intermediate portions of the belt are in firm engagement with the selected sleeve and the adjacent sleeve to prevent rotation thereof.

8. The zoning conveyor as set forth in either claim 4 or 5 further characterized by the provision of control means capable of causing the operation of said stop means.

9. The zoning conveyor as set forth in claim 8 wherein the control means includes an article position sensor.

10. The zoning conveyor as set forth in claim 9 wherein the article position sensor is a microswitch disposed in the path of travel of the articles conveyed by the conveyor means.

11. The zoning conveyor as set forth in claim 9 wherein the article position sensor is a photocell.

12. The zoning conveyor as set forth in claim 8 wherein the control means can be caused to be selectively operated.

* * * * *